United States Patent [19]
Unosawa et al.

[11] Patent Number: 5,489,335
[45] Date of Patent: Feb. 6, 1996

[54] METHOD OF SUGAR COATING AND APPARATUS THEREFOR

[75] Inventors: Kazuomi Unosawa; Narimichi Takei, both of Hamamatsu; Kuniaki Yamanaka, Shizuoka; Mamoru Sugiyama, Hamamatsu, all of Japan

[73] Assignee: Freund Industrial Co., Ltd., Tokyo, Japan

[21] Appl. No.: 297,607

[22] Filed: Aug. 29, 1994

[30]     Foreign Application Priority Data

Aug. 31, 1993 [JP] Japan ................... 5-215352
Sep. 3, 1993 [JP] Japan ................... 5-219669
Mar. 23, 1994 [JP] Japan ................... 6-051595

[51] Int. Cl.$^6$ ................................. A23G 3/26
[52] U.S. Cl. .................. 118/19; 118/20; 118/303; 118/417; 118/418; 427/212; 427/215; 427/421; 427/242
[58] Field of Search ................. 427/215, 421, 427/212, 242; 118/19, 20, 417, 418, 303; 366/64, 65, 259

[56]           References Cited

U.S. PATENT DOCUMENTS 5,050,528  9/1991  Yamada et al. ................... 118/19

*Primary Examiner*—Shrive Beck
*Assistant Examiner*—David M. Maiorana
*Attorney, Agent, or Firm*—Kane, Dalsimer, Sullivan, Kurucz, Levy, Eisele and Richard

[57]           ABSTRACT

A method of and an apparatus for sugar coating, the apparatus comprising: a rotatable vessel for containing a material to be coated; a baffle 9 movable independently of the rotatable vessel; a baffle mounting shaft 10 having a bent construction, for mounting the baffle 9 thereon; and a hydraulic cylinder for rocking the baffle mounting shaft 10 to displace the baffle 9. Load cells 17a and 17b for detecting the position of the baffle 9 relative to an accumulated layer M of a material to be coated are provided on the baffle 9. The load cells 17a and 17b serves for holding the position of the baffle 9 relative to the accumulated layer M of the material to be coated at all times, on the basis of a load imposed due to the presence of the contact with the material to be coated.

4 Claims, 4 Drawing Sheets

METHOD OF SUGAR COATING AND APPARATUS THEREFOR

BACKGROUND OF THE INVENTION

1. Field of the Invention

This invention relates to a technique of applying sugar coating on tablets etc., and particularly to a technique of sugar coating which contributes to uniform sugar coating and improvements in its finish.

2. Related Art Statement

It is conventional that, in order to apply sugar coating on tablets, pills and the like, materials to be coated such as the tablets, pills and the like are charged into an apparatus called a pan coating apparatus, and aqueous solution of sucrose is sprayed onto the material to be coated and dried while a pan, i.e., a rotatable vessel is rotated. The pan coating apparatuses used for that purpose include an open-type or semi-open type onion pan which has been used for a long time, and apparatuses which are provided with porous portions in the walls of the vessels for ventilating an accumulated layer of the material to be coated (for example, apparatuses put on the market by trade names of HI-COATER and AQUA COATER.

In these apparatuses, a member for agitating the materials to be coated, which is referred to as a "baffle" is mounted for the purpose of achieving uniform coating. Normally, such a type of construction is adopted that a plate-shaped protrusion is erected on an inner wall of the coating pan.

In contrast thereto, there is proposed an apparatus of a type having a fixed baffle (trade name: Static Baffle) which is inserted into the coating pan instead of being attached on the coating pan.

Namely, in Japanese Patent Publication No. 52-10665, there is shown a roof-shaped baffle consisting of two plate-shaped members, which have one side in common, is provided on an onion pan.

Furthermore, in U.S. Pat. No. 5,038,709 (EP Application Publication No. 355,771), there is disclosed an apparatus, in which a fixed baffle being displaceable in the vertical direction and variable in angle, is provided on a ventilating type coating pan.

Furthermore, in U.S. Pat. No. 5,033,405 (EP Application Publication No. 406904), there is described that a fixed baffle is provided on a polygonal coating pan.

Furthermore, in EP Application Publication No. 609,444, there is disclosed a device for rotating these baffle means.

In any one of the above-described known techniques, it is the premise that the baffle is fixed at a definite position while in one treatment stage.

Namely, in the above-described Japanese Patent Publication No. 52-10665, there is no suggestion that the position of the baffle is varied at all.

Furthermore, the apparatus of the above-described U.S. Pat. No. 5,038,709 is provided thereon with a baffle displacing means. In this U.S. Pat. No. 5,038,709, there is disclosed that displacement is made in accordance with the conditions of the process such as quantity of powdery/granular material and a stage of the process, and the baffle is displaced to a height above the layer of the treated material at the time of nonuse or its washing. However, this does not mean to displace the baffle during a stage of the process, but the baffle is held at a difinite position during a stage of the process. This is also true of the apparatus of the above-described U.S. Pat. No. 5,033,405. Further, also in EP Application Publication No. 609,444, no detailed disclosure about displacement of the baffle is given.

Thus, in the conventional technique, for the fixed baffle system, in which the independently movable baffle is provided separately from the coating pan, the mounted position of the baffle is changed for each batch stage of treating the material to be coated and, in the case of sugar coating, the volume of the material to be coated is increased gradually in accordance with the progress of process, whereby the baffle is displaced accordingly.

The fixed baffle system makes it easy to wash the coating pan, so that the working time can be shortened and the system is preferable also from the viewpoint of GMP (Good Manufacturing Practice) and the validation. However, in the case of the sugar coating, mixing effect is unsatisfactory as compared with the case of the baffle erected on the inner wall of the pan, whereby there are such disadvantages that there is large unevenness (deviation in weight) in coating quantity on the coated material and the finish is unsatisfactory. These disadvantages cannot be obviated even by displacing the baffle, for example, in accordance with the progress of process as described above.

When the present inventors studied the cause of the above-described disadvantages, such a fact was found that, in sugar coating, process of the gradual increase of the volume of the material to be coated does not smoothly proceed in accordance with the progress of the coating treatment, and, on the contrary, the increase of the volume follows serrated process in which the volume increases or decreases for each unit operation of one cycle in the coating processe, thus the volume in a same unit operation in a different cycle, i.e. stage increases little by little in accordance with the progress of the process.

The change in the volume during one cycle is very large, and, although it varies with conditions, it is usual that the volume change is as large as the volume change in a static state from the start to the end of the coating process. Accordingly, it is unsatisfactory to simply displace the position of the baffle in accordance with the treatment stage as in the conventional technique, and, the present inventors have found that, if there is no displacement of the baffle during the same treatment stage, then the baffle cannot be placed constantly at a proper position, so that the above-described disadvantages are presented.

In the ventilating type pan coating, the process of sugar coating consists of approximately 20 to 50 cycles (spray cycles) to repeat, each cycle consisting of three or four unit operations including spraying (or pouring) of syrup→Pause I (→Pause II)→drying, to thereby gradually form sugar layers on the material to be coated.

In this process, during the time period from the halfway course of the spraying operation to the Pause I operation where the syrup is spreaded and coated uniformly on the surface of the material to be coated, the material to be coated is lumped together to be raised up due to the adhesion of the syrup, so that the volume of the material to be coated becomes very large. At that time, if the baffle is not displaced to the higher position, then the amount of the syrup adhering to the material to be coated becomes uneven, causing its surface to become rough.

In the Pause II, drying by cool air is performed and the adhesion is decreased, the volume of the material to be coated becoming gradually smaller. In the following drying operation, the volume returns to a state of being low and settled.

Even in the conventional coating pan such as the onion pan, substantially the same process is followed.

SUMMARY OF THE INVENTION

The present invention is based on such a discovery that, when the position of the baffle is changed to a proper position and held thereat in association with the vertical fluctuations of the volume during the above-described same treatment stage, the unevenness of the coating is obviated and the satisfactory finish is obtained.

Namely, the present invention relates to a method of sugar coating using a pan coating apparatus having a rotatable vessel for containing a material to be coated and a baffle means movable independently of the rotatable vessel, and to an apparatus for that method, wherein at least two displacements of the baffle means, including the displacements toward reverse directions, are performed in each one cycle of coating process, so that the sugar coating is performed while the baffle means is held at a proper position.

According to the present invention, it is at least necessary that the baffle is raised to the proper position during the time period from the halfway course of the spraying operation to the end of the Pause I operation, and the baffle is lowered to the vicinity of the original position during the time period from the start of the Pause II operation to the end of the drying operation. It is preferable to finely displace the position of the baffle so as to keep the baffle at the proper positions. Particularly, it is preferable to displace the baffle to keep such a state that one part of the baffle is inserted into an accumulated layer of the material to be coated and the other part of the baffle is exposed to the outside of that layer.

The above-described displacement of the baffle may be manually operated by visual observation, but it is preferable to operate automatically. In order to displace the baffle automatically, there can be adopted various methods including, for example, a method, in which the volume of the material to be coated is measured by a sensor provided independently of the baffle to thereby determine the position of the baffle; a method, in which one or a plurality of sensors are mounted on the baffle to detect contact of the baffle with the contents of the vessel or degree of the contact to thereby adjust the position of the baffle; and a method, in which a sequence of changes in the volume of the same material to be coated is previously measured to thereby set the position of the baffle by using a memory means, into which the previously measured result has been stored.

As the above-described method in which one or a plurality of sensors are mounted on the baffle, mention can be made of a method where a sensor is mounted at each of two positions disposed on the baffle at different heights from each other, and the position of the baffle is adjusted such that the sensor positioned below comes into contact with the material to be coated and the sensor positioned above is not in contact with the material to be coated.

Furthermore, in the present invention, "the proper position" of the baffle includes not only one in the vertical direction but also the proper position obtained by displacing the baffle in the horizontal direction or by changing the angle of the baffle.

The present invention is applicable to the open type and semi-open type coating pans such as the onion type, an apple type and a pear type, which have been used for a long time. It, however, is preferable to use the pan coating apparatus such as ones put on the market by the trade names of Hi Coater, Aqua Coater and the like for example, which are constructed such that a rotatable vessel for containig the material to be coated is substantially rotated about a horizontal shaft, and a porous ventilating portion is provided in a wall of the rotatable vessel to ventilate an accumulated layer of the material to be coated.

DETAILED DESCRIPTION OF THE PREFERRED EMBODIMENTS

The embodiments of the present invention will hereunder be described in detail with reference to the drawings.

Embodiment 1

Figure 1:
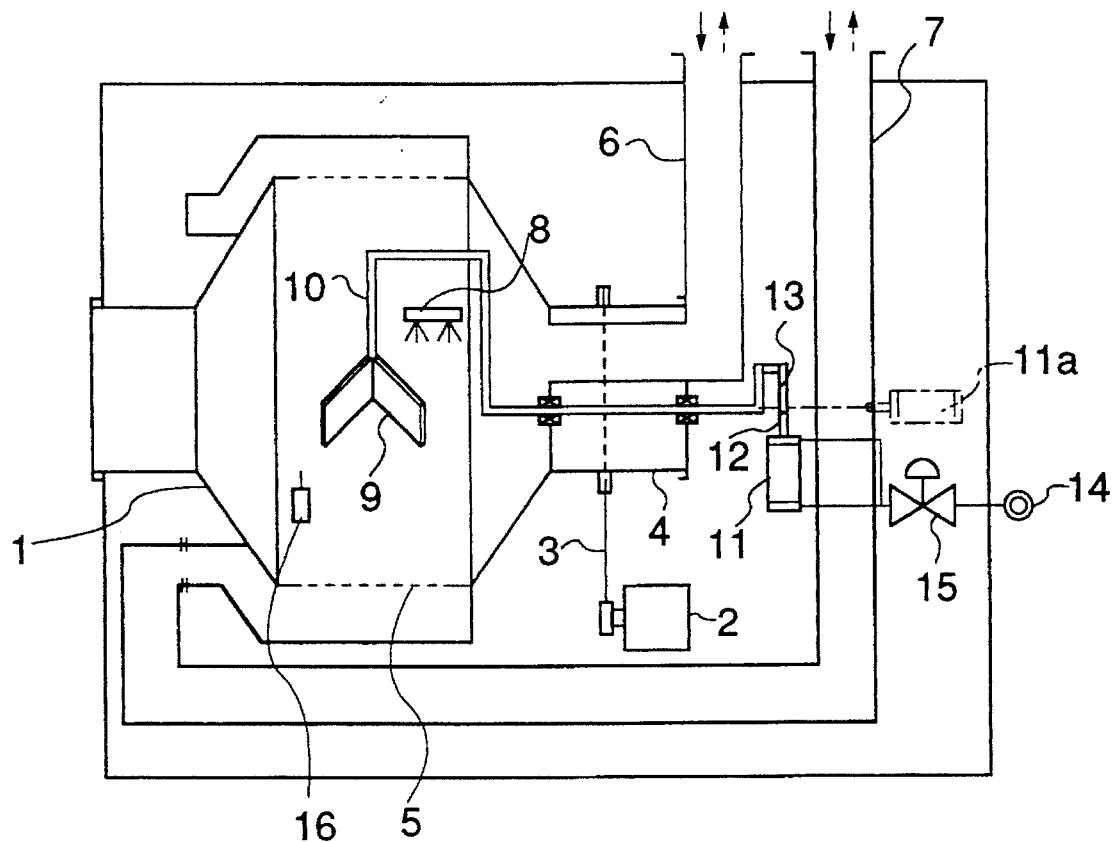
FIG. 1 is a schematic explanatory view showing one embodiment of the sugar coating apparatus according to the present invention.

FIG. 1 is the schematic explanatory view showing one embodiment of the sugar coating apparatus according to the present invention.

The sugar coating apparatus of this embodiment is constructed such that a rotatable vessel (pan) 1 for containing powdery or granular material such as tablets, pills and the like as being material to be coated is rotated about a horizontal axis together with a horizontal shaft portion 4 by a motor 2 and a belt 3. In a wall of the rotatable vessel 1, a porous ventilating portion 5 is provided at predetermined intervals or continuously in the circumferential direction.

Supply and discharge of drying air to the rotatable vessel and therefrom are performed through ducts 6 and 7. As schematically shown in FIG. 1, a spray nozzle 8 for spraying coating solution such for example as syrup is inserted into the rotatable vessel 1.

Further, a baffle 9 as being a means for agitating an accumulated layer of the material to be coated is inserted into the rotatable vessel 1 in this embodiment. As exemplified in FIG. 3, in the case of the rotatable vessel having a diameter of about 1 m, this baffle 9 is constructed such that two baffle plates 9a and 9b each having a length-wise dimension of 100 mm and a width-wise dimension of 200 mm are fixed to the distal end of a baffle mounting shaft 10 at an angle of 90° relative to each other.

This baffle 9 is movable independently of the rotatable vessel 1 and constructed such that the baffle can be desirably automatically displaced to the proper position not only in the vertical direction but also in the horizontal direction. That is, as shown in FIG. 1, the baffle mounting shaft 10 in this embodiment has a substantially crank-shaped bent construction, in which the baffle mounting shaft is bent into L shapes at a plurality of positions from the distal end portion thereof, where the baffle 9 is mounted, to the proximal end portion.

Figure 2:
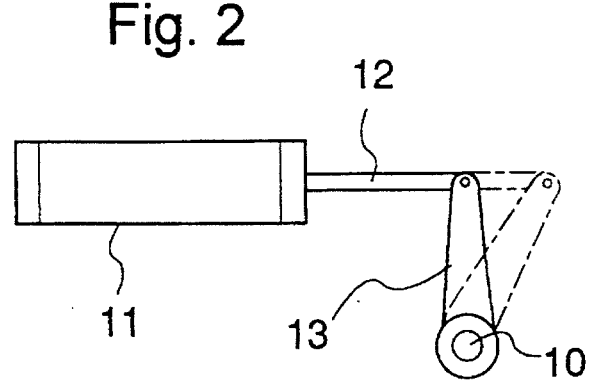
FIG. 2 is a side view showing an example of a hydraulic cylinder used In the embodiment shown in FIG. 1.

A hydraulic cylinder 11, i.e., an air cylinder or an oil hydraulic cylinder as being an example of a baffle displacing means is provided at the proximal end of this baffle mounting shaft 10. A piston rod 12 of this hydraulic cylinder 11 is advanced or retracted, whereby, as shown in FIG. 2, a crank member 13 fixed to the proximal end of the baffle mounting shaft 10 in the radial direction is rocked, whereby the baffle mounting shaft 10 is rocked together with the crank member 13, so that the baffle 9 can be displaced relative to the accumulated layer of the material to be coated in the vertical direction.

Incidentally, supply of compressed air or the like to the hydraulic cylinder 11 is performed from a hydraulic pressure source 14 such for example as a compressor through a pressure regulating valve 15.

Furthermore, as schematically shown in FIG. 1, a vibration sensor 16 movable in the vertical direction independently of the baffle 9 is provided in the rotatable vessel 1, whereby the vibrations caused by the contact between the vibration sensor 16 and the material to be coated are detected. The vibration sensor 16 is controlled to be brought to the lowest position maintainig the state of non-vibration, so that, in an interlocking relation with this position of the vibration sensor 16, the position of the baffle 9 can be displaced.

Operation of this embodiment will hereunder be described.

Firstly in performing the pan coating, tablets as being a material to be coated are charged into the rotatable vessel 1 for example, and syrup as being coating solution is sprayed from the spray nozzle 8 for example, while the rotatable vessel 1 is rotated about the horizontal axis by the motor 2 and the belt 3, and gas @@@ such as air is supplied or discharged through the ducts 6, 7 and the porous ventilating portion 5, thus performing the sugar coating.

At that time, during the process of the sugar coating, the pan coating process is proceeded by repeating a cycle comprising unit operations of syrup spraying→Pause I→Pause II→drying, and as the pan coating process progresses, the volume of the tablets as being the material to be coated is changed in the vertical direction, i.e., increases and decreases for each unit operation in each cycle.

On the basis of the above-described findings, in the present embodiment, the baffle 9 provided for agitating the tablets is displaced at least two times including reverse direction displacements, for example, upward and downward displacements, or displacements in leftward and rightward directions or in the advancing and retracting directions relative to the axial direction of the rotatable vessel 1, in accordance with the vertical changes in the volume of the tablets during each cycle of the coating process.

That is, in the present embodiment, the baffle 9 is raised during the time period of from the start of the spray operation to the end of the next unit operation, and lowered during the time period from the start of the unit operation before the drying operation to the end of the drying operation, so that desirable displacements can be performed.

In that case, in order to displace the baffle 9 in the vertical direction, the compressed gas is supplied to the hydraulic cylinder 11 from the hydraulic pressure source 14 through the pressure regulating valve 15 or discharged therefrom, whereby the piston rod 12 of the hydraulic cylinder 11 is advanced or retracted, so that the baffle mounting shaft 10 is rocked through the crank member 13. With this arrangement, the baffle 9 is automatically displaced in the vertical direction.

As described above, the baffle 9 is displaced at least two times including the displacements in the reverse directions in each one cycle of the pan coating process, so that the uniform pan coating can be performed.

Embodiment 2

Figure 5:
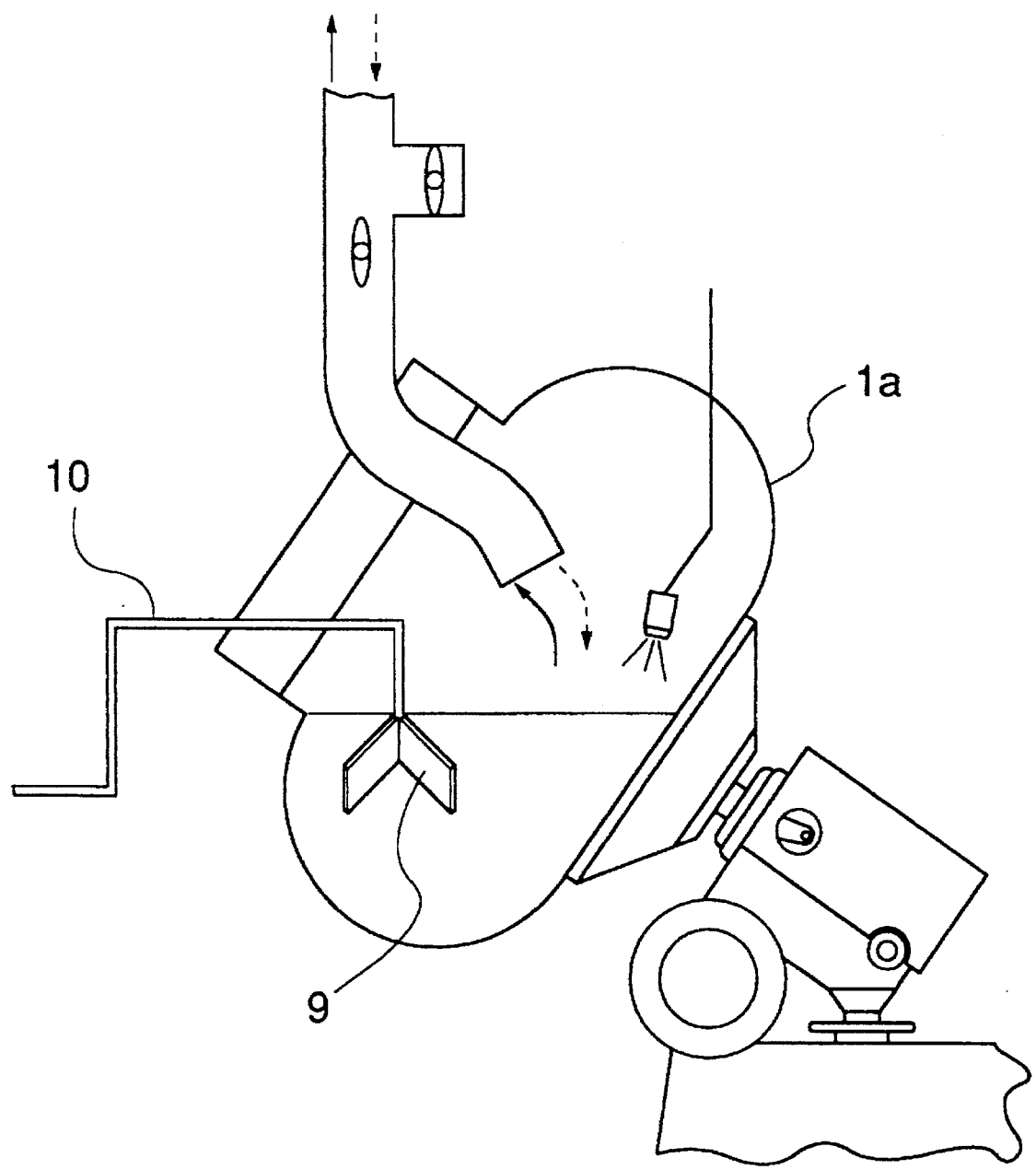
FIG. 5 is a schematic explanatory view showing another embodiment of the sugar coating apparatus according to the present invention.

FIG. 5 shows the example of using the so-called onion type coating apparatus as another embodiment of the sugar coating apparatus according to the present invention.

In the case of this embodiment also, the baffle 9 is movable independently of a rotatable vessel 1a which is normally referred to as the onion pan (a baffle displacing means is not shown in FIG. 5 for the purpose of simplicity) and the baffle 9 is displaced at least two times including the displacements in the reverse directions during each one cycle of the coating process. Thus, the sugar coating is performed while the baffle 9 is held at the proper positions, so that uniform and satisfactory coating products can be obtained.

Embodiment 3

Figure 6:
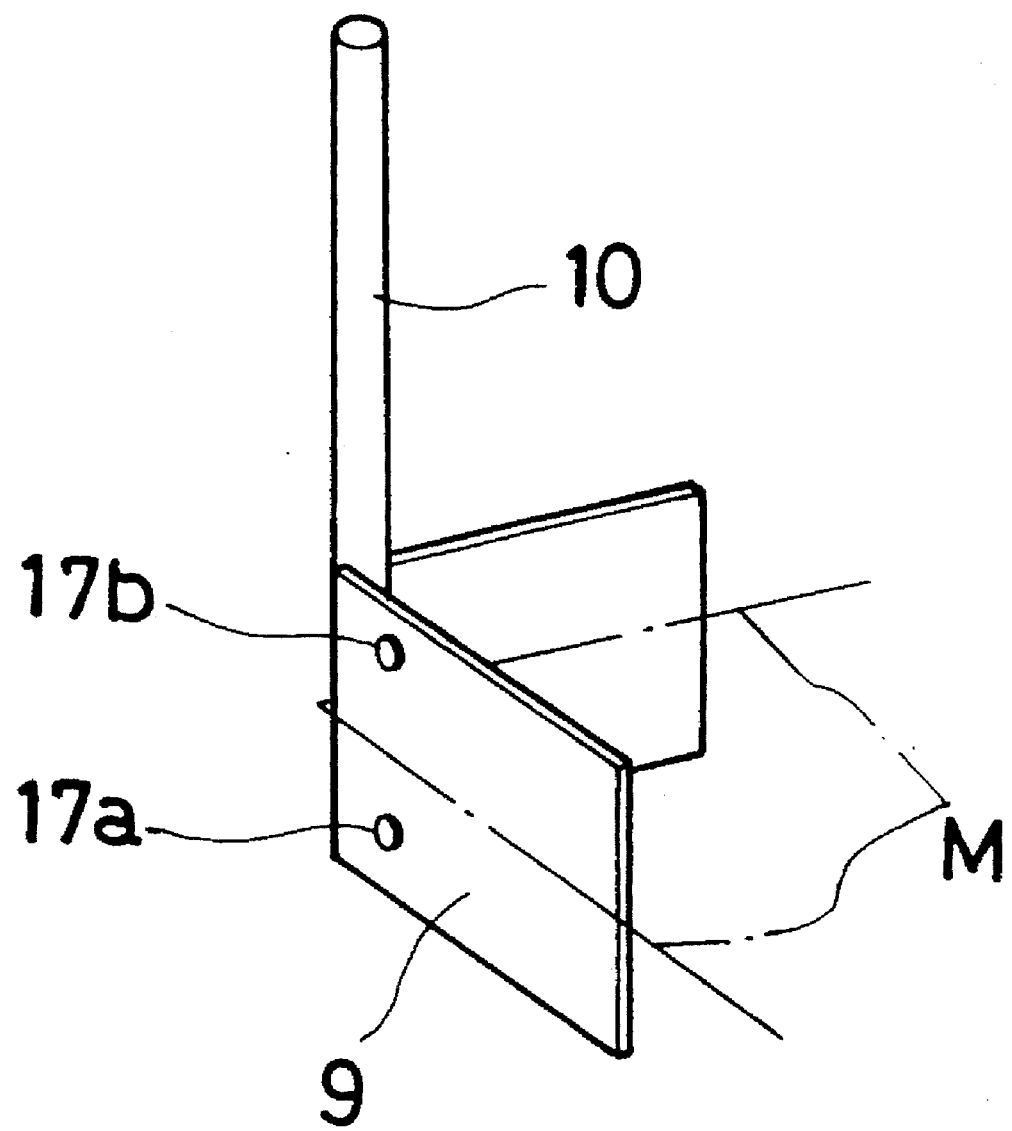
FIG. 6 is a view showing another example of the baffle used in the present invention.

This Embodiment 3 is identical with the embodiment 1, except for that there is no vibration sensor 16 which is present in the embodiment shown in FIG. 1, and, as shown in FIG. 6, thin load cells 17a and 17b (strain detecting sensors) as being the examples of the sensors are attached to the baffle 9 at two positions in the vertical direction.

The load cells 17a and 17b are adapted to detect the position of the baffle 9 relative to an accumulated layer M of the material to be coated, and a detected signal is transmitted to the pressure regulating valve 15, so that the cylinder 11 can be controlled.

In this Embodiment 3, the load cell 17a disposed at a lower position comes into contact with the material to be coated to generate a load, while the load cell 17b disposed at the upper position is disposed outside of the accumulated layer M of the material to be coated and is not in contact with the material to be coated and does not generate a load.

Accordingly, in this embodiment 3, the pressure regulating valve 15 is controlled in response to the detection signal implying presence and non-presence of a load generated by the contact of the load cells 17a, 17b with the material to be coated, whereby the piston rod 12 is advanced or retracted and the baffle 9 is automatically displaced so that one part of the baffle 9 is constantly inserted into the accumulated layer M of the material to be coated and the other part of the baffle 9 is held in a state of being exposed to the outside of the layer M.

Thus, the sugar coating is performed while the baffle 9 is held at the proper positions, so that uniform coating can be performed and the satisfactory finish can be achieved.

Hereinabove, the present invention has been described with reference to the embodiments. The present invention, however, should not be limited to the above-described embodiments, and other various modifications can be made.

For example, in order to displace the baffle 9 in the axial direction of the rotatable vessel 1, there may be provided, as a baffle displacing means, for example, a hydraulic cylinder 11a as indicated by two-dot chain lines in FIG. 1 so that the baffle 9 is displaced in the axial direction of the rotatable vessel 1 together with the baffle ,mounting shaft 10.

Furthermore, any baffle displacing means other than the hydraulic cylinders 11, 11a and the baffle mounting shaft 10 having the bent construction may be used.

Further, any baffle means other than the baffle 9 illustrated and described above may be used. Experiment As a sugar coating apparatus, the apparatus shown in FIG. 1, i.e., Aqua Coater 100 (trade name, manufactured by Freund Industrial Co., Ltd.) was used together with baffle displacing means in accordance with the present invention, and 35 kg of lactose tablets 8ϕ, 6.5 CR and 180 mg/tablet were sugar-coated.

The sugar coating solution was formulated by 40.0% of sucrose, 15.6% of talc, 22.0% of calcium carbonate, 1.4% of gum arabic, 0.5% of gelatine, 0.5% of PEP-101 (polyoxyethylene-polyoxypropylene block copolymer, manufactured by Freund Industrial Co., Ltd.) and 20.0% of water, the total amount of the solution used amounting to 30 kg ("%" means percent by weight).

The coating conditions were set such that the temperature of the supplied air was 60° C., the flow rate of the supplied air was 13 m$^3$/min, the static pressure in the pan was −7—−4 mmAq and the rotation speed of the pan was 8 r.p.m. The number of spray cycles of the coating process was 22 and the required time for the coating was 167 min.

Figure 3:
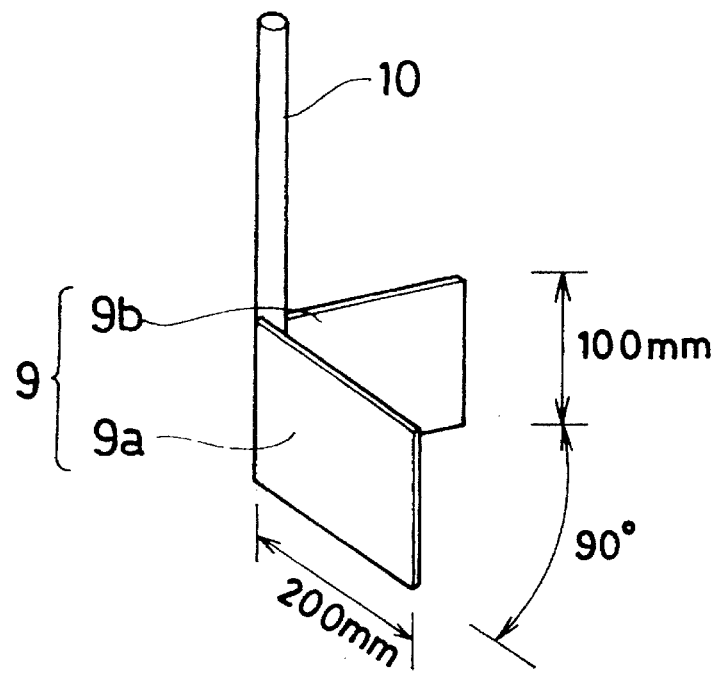
FIG. 3 is a view showing an example of a baffle used in the present invention.

In this pan coating process, the baffle shown in FIG. 3 was used. The vibration sensor movable vertically and independently of this baffle was provided to detect vibrations due to the contact with the tablets.

The vibration sensor was controlled to be brought to the lowest position while keeping the vibration sensor free from the vibrations, and, in interlocking relation therewith, 1/3 of the baffle was displaced to a position where the baffle was exposed out of the layer of tablets.

Furthermore, differently from the present invention, there was carried an experiment of the conventional method under the same conditions except that the position of the baffle was gradually raised in accordance with the program calculated from the volume in the drying operation.

Figure 4:
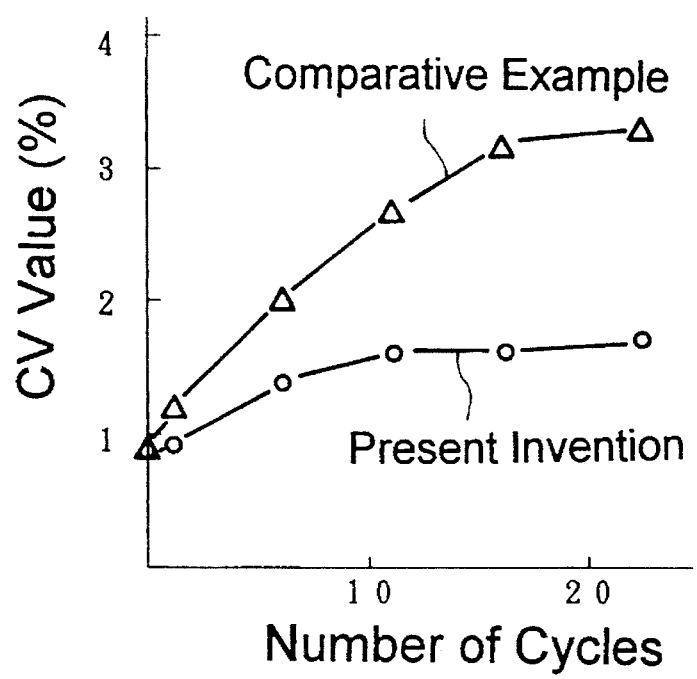
FIG. 4 is a view showing CV values in comparison between the present invention and a comparative example.

In each of the coating experiments, the contents were collected every several cycles, the weights of the respective 100 pieces of the contents were measured and the coefficients of variations (CV value) of the weights were sought. FIG. 4 shows the comparison between the present invention and a comparative example, depicting changes of the CV values during the progress of the coating process.

As apparent from FIG. 4, according to the present invention, tablets having lower CV value, i.e. more uniform coating as compared with the comparative example were obtained. Furthermore, as for the finish of the tablets, the surface according to the present invention is smoother than that obtained by the comparative example.

The effects attained by the present invention include the following.

1). According to the present invention, uniform coating can be obtained by carrying out, during each one cycle of the coating process, at least two displacements of the baffle means including the displacements in the reverse directions, the baffle means being held at the proper positions.

2). Furthermore, according to the present invention, the finish of the coating can be made satisfactory.

3). Further, one part of the baffle means is inserted into the accumulated layer of the material to be coated and the other part is held exposed to the outside of the layer, so that the uniformity of the coating can be further improved and the finish can be made satisfactory.

What is claimed is:

1. A pan coating apparatus for sugar coating, comprising:

a rotatable vessel for containing a material to be coated;

a baffle means movable automatically and independently of the rotatable vessel;

a baffle displacing means which can perform at least two displacements of the baffle means, including displacements in reverse directions from each other, during each one cycle of the coating process; and, sensor means for detecting a position of said baffle relative to a surface of an accumulated layer of the material to be coated, said baffle displacing means displacing said baffle means in response to said sensor means so that a part of said baffle means is inserted into said accumulated layer and another part of said baffle is maintained outside of said accumulated layer.

2. The apparatus for sugar coating as set forth in claim 1, wherein:

said rotatable vessel is rotated substantially about a horizontal shaft and a porous ventilating portion is formed in a wall of said rotatable vessel to ventilate the accumulated layer of the material to be coated.

3. The apparatus for sugar coating as set forth in claim 1, wherein:

said baffle displacing means includes
(1) a baffle mounting shaft having a bent construction and mounted thereon to the distal end thereof with said baffle means, and
(2) an actuator for rocking said baffle mounting shaft.

4. The apparatus for sugar coating as set forth in claim 3, wherein:

said baffle mounting shaft has a construction of being bent into substantially L shapes at plural positions of said shaft, and said actuator consists of a hydraulic cylinder for rocking said baffle mounting shaft.

* * * * *